United States Patent
Oberg

(10) Patent No.: US 8,355,302 B1
(45) Date of Patent: Jan. 15, 2013

(54) OFFSET LOOP FOR WOBBLE

(75) Inventor: Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 206 days.

(21) Appl. No.: 12/484,417

(22) Filed: Jun. 15, 2009

Related U.S. Application Data

(63) Continuation-in-part of application No. 11/746,371, filed on May 9, 2007, now Pat. No. 7,821,889.

(60) Provisional application No. 61/144,913, filed on Jan. 15, 2009, provisional application No. 60/799,586, filed on May 11, 2006.

(51) Int. Cl.
*G11B 20/10* (2006.01)

(52) U.S. Cl. .................. 369/47.27; 369/44.29

(58) Field of Classification Search .............. 369/44.11, 369/44.26, 47.36, 47.44, 47.45, 53.43, 44.29, 369/44.35, 44.27, 124.11–124.12
See application file for complete search history.

(56) References Cited

U.S. PATENT DOCUMENTS

| | | | |
|---|---|---|---|
| 6,157,603 A * | 12/2000 | Okubo et al. | 369/53.1 |
| 6,324,244 B1 * | 11/2001 | Lauter et al. | 378/4 |
| 6,661,852 B1 * | 12/2003 | Genrich | 375/326 |
| 2002/0067676 A1 * | 6/2002 | Inokuchi et al. | 369/59.15 |
| 2004/0095862 A1 * | 5/2004 | Nakajima et al. | 369/47.28 |
| 2004/0252608 A1 * | 12/2004 | Park et al. | 369/47.27 |
| 2005/0094515 A1 * | 5/2005 | Nagai et al. | 369/47.27 |
| 2005/0195511 A1 * | 9/2005 | Sano et al. | 360/51 |
| 2006/0203631 A1 * | 9/2006 | Wu et al. | 369/44.26 |
| 2007/0216562 A1 * | 9/2007 | Teo et al. | 341/155 |

* cited by examiner

*Primary Examiner* — Wayne Young
*Assistant Examiner* — Brenda Bernardi

(57) ABSTRACT

Aspects of the disclosure can provide a method for generating an offset correction signal with a reduced circuit footprint. The method can include converting samples of a wobble signal into digital values having a reduced number of bits, integrating the digital values having the reduced number of bits over a specified time interval to determine an error signal, and generating an offset correction signal based on the determined error signal.

20 Claims, 11 Drawing Sheets

OFFSET LOOP FOR WOBBLE

INCORPORATION BY REFERENCE

This application claims the benefit of U.S. Provisional Application No. 61/144,913, "Improved Offset Loop for Wobble" filed on Jan. 15, 2009, and is a continuation-in-part of U.S. patent application Ser. No. 11/746,371, "Improved Offset Loop for Wobble", filed on May 9, 2007, which in turn claims the benefit of U.S. Provisional Application No. 60/799,586, "Improved Offset Loop for Wobble" filed on May 11, 2006. The entire disclosures of the prior applications are hereby incorporated herein by reference in their entirety.

BACKGROUND

The systems and methods according to this disclosure are directed to reducing data recovery errors including low frequency distortions that can degrade the quality of timing loop information and/or detection of address information in digital data recording systems, particularly those in which data is recorded on recordable or re-recordable optical disc data storage media.

With a need to provide removable non-volatile data storage media on which increasing amounts of data can be recorded and/or re-recorded, optical disc data storage media have proven both comprehensive and flexible enough to support expanding data storage requirements. Optical disc data storage relates to placing data on a recordable, re-recordable and/or readable surface of an optical disc. In general, to record data on, or recover data previously recorded on, an optical disc, a light beam is used to scan the surface of the optical disc using systems specifically designed for such data recovery. Currently-available recordable or re-recordable optical disc data storage media include: CD-R (Compact Disc-Recordable), DVD-R (Digital Video Disc-Recordable), DVD-RW (DVD-Rewritable), DVD+R (Writable Optical Disc), DVD+RW (Rewritable Optical Disc), DVD-RAM (DVD-Random Access Memory), and new technology higher density recordable or re-recordable optical data storage discs known as BD technology, such as HD-DVD (High Density-DVD or High Definition-DVD) and Blu-ray Discs.

Differing methodologies are, therefore, required by which, when data is recorded or re-recorded to such optical disc data storage media, a timing synchronization signal is provided, monitored and adjusted in order that the readback, or data retrieval, system is cued to retrieve the discretely recorded or re-recorded data from a discrete portion of the disc at the precise speed with which the data was recorded.

A conventional optical disc formatted for land-groove recording is shown in exemplary embodiment in FIG. 1. Digital data is stored on such optical discs in the form of arrangements of data marks in spiral tracks. As shown in FIG. 1, grooves 100 and lands 110 are formed by means of a guide channel cut into the surface of a disc substrate. A recording layer (not identified) is then formed over the entire disc surface including the surfaces of the grooves 100 and the lands 110. The grooves 100 and the lands 110 each form continuous recording tracks on the disc. Data recording and reproducing are accomplished with such an optical disc storage medium by scanning the groove recording track or the land recording track with a focused light beam spot of an optical disc drive device, as shown in, and described in connection with, FIGS. 2 and 3 below. It should be noted that, in some formats, data is recorded both on lands and grooves. In other formats, data is recorded only in the grooves.

FIG. 2 illustrates an exemplary conventional apparatus for implementing a process to write data to an optical disc data storage medium. As shown in FIG. 2, an input stream of digital information 200 is converted using an encoding/modulating unit (encoder/modulator) 205 into a drive signal 210 for a light source such as a laser source 220. The laser source 220 emits a light beam 225 that is directed toward, and focused onto, a recording surface 250 of an optical disc data storage medium 245. The focusing of the light beam 225 typically involves an illumination optics unit 230 to produce a very precise scanning spot 240. The diameter of the scanning spot 240 precisely coincides with the width of the groove and/or the land in the optical disc data storage medium 245. In order to accommodate more information on a single optical disc data storage medium, the lands and the grooves are made individually thinner in a radial direction requiring that the illumination optics unit 230 ever-more-precisely focus the scanning spot 240, thereby reducing the diameter of the scanning spot 240. As the surface 250 of optical disc data storage medium 245 is rotated under the scanning spot 240, energy from the scanning spot 240 is absorbed by a surface treatment on the surface 250 of the optical disc data storage medium 245 through heating of a small, localized region of the surface 250. The reflective properties of the surface 250 of the optical disc data storage medium 245 are thus locally discretely altered in accordance with, and to reflect recording of, the input data stream 200. Modulation of the light beam 225 is synchronous with the drive signal 210, so a circular track of data marks is formed as newly written data 235 as the surface 250 rotates.

FIG. 3 illustrates an exemplary conventional apparatus for implementing a process to read data from an optical disc data storage medium. As shown in FIG. 3, a light beam 305 from a light source such as a laser source 300 (which may be the same as the writing laser source 220 shown in FIG. 2) is directed through a beam splitter device 310 into an illumination optics unit 320 (which may be the same as illumination optics unit 230 shown in FIG. 2) to focus the light beam 305 onto a surface 340 of the recorded optical disc data storage medium 335. As previously-recorded data marks to be read 345 pass under a scanning spot 350, light is reflected toward the illumination optics unit 320. Reflected light is collected by the illumination optics unit 320 and directed by the beam splitter 310 toward a collector of a data optics unit 360. The data optics unit 360 converges the reflected light onto one or more detectors in a light detector array 370. Detectors in the detector array 370 convert the reflected light into a current modulated signal 375. This collected current modulated signal 375 is amplified and/or decoded in an amplifier/decoder unit 380 to produce an output data stream 385 that corresponds to the previously-recorded data marks to be read 345 from the surface 340 of the optical disc data storage medium 335.

In data storage applications, inclusion of synchronizing marks, also referred to as timing information marks, and physical location information, are essential for recording data at a certain location on the optical disc data storage medium to facilitate, among other capabilities, finding the data location at a later time. A sector number, sector type and a land track/groove track can be recognized from the address information. In other words, the address information provides information for finding a specified sector to record/reproduce data to/from a certain location in an optical disc data storage medium.

When data is stored randomly on an optical disc data storage medium, various methods are included in the recording process to encode address and timing synchronization information. One method includes recording such information on, for example, a non-data area or non-recording area of the optical disc data storage medium by forming embossed pits separately from data recording sectors. These pits are preformed and then during the recording process recorded with non-data information to facilitate data identification and location, and timing synchronization for readback. A drawback to this method, however, is that these pre-pitted areas reduce the effective recording area of the optical disc data storage medium. Another method employed, particularly for higher density recording applications, is referred to as "wobbling" in which the lands and grooves of an optical disc data storage medium are pre-wobbled, in a radial direction, at a specific frequency.

FIG. 4 illustrates an exemplary embodiment of a conventional optical disc data storage medium 400 into which a predetermined reference wobble 410 is physically encoded, i.e., the grooves (and/or lands) of the recordable surface of the optical disc data storage medium are physically pre-wobbled at a given frequency. As shown in FIG. 4, a sinusoidal wave with an amplitude in a radial direction is physically introduced into the grooves. When data is recorded, frequency or phase modulation is then performed around this reference wobble. Alternatively, land pre-pits may be performed on the wobble signal to carry data, such as address information. The address information is encoded in a modulated wobble signal, and introduced, for example, with a measurable, modulated signal offset when the data is recorded to the optical disc data storage medium 400. During readback of, and/or other recovery of data from, the optical disc data storage medium, an address of the pre-recorded data may be identified by demodulating the recorded wobble signal from the reference wobble. Timing synchronization information for, for example, controlling rotation speed of the optical disc data storage medium precisely to facilitate clear readback or data recovery may be implemented by demodulating a modulated wobble signal in comparison to a wobble reference signal. Precise timing synchronization for readback and/or other data recovery is implemented through use of a timing loop such as, for example, a phase-locked loop to control a readback speed of data from a sector of the optical disc data storage medium in response to the demodulated recorded wobble signal.

Errors in detecting and properly employing a wobble signal may be introduced by, for example, presence of low frequency distortion and/or a DC-offset component in the wobble signal.

SUMMARY

Aspects of the disclosure can provide a method for generating an offset correction signal with a reduced circuit footprint. The method can include converting samples of a signal into digital values having a reduced number of bits, integrating the digital values having the reduced number of bits over a time interval to determine an error signal, and generating an offset correction signal based on the determined error signal.

In an embodiment, to convert the samples of the signal into the digital values having the reduced number of bits, the method can further include converting the samples of the signal into intermediate digital values having a first number of bits that is larger than the reduced number of bits, and reducing resolution of the intermediate digital values to convert the intermediate digital values into the digital values having the reduced number of bits.

To reduce resolution of the intermediate digital values to convert the intermediate digital values into the digital values having the reduced number of bits, the method can include slicing the intermediate digital values by a threshold value and converting the intermediate digital values into the digital values based on the slicing.

In another embodiment, to convert the samples of the signal into the digital values having the reduced number of bits, the method can include converting the samples of the signal by a first analog to digital converter having a first resolution, and converting the samples of the signal into the digital values by a second analog to digital converter having a second resolution that is lower than the first resolution.

Alternatively, to convert the samples of the signal into the digital values having the reduced number of bits, the method can include comparing the samples of the signal to a threshold, and outputting a 1-bit digit based on the comparison.

According to an aspect of the disclosure, the time interval can include a positive integer number of wobble periods.

To integrate the digital values having the reduced number of bits over the time interval to determine the error signal, the method can include resetting an accumulator, accumulating the digital values over the time interval, and outputting the accumulated digital values.

Further, to generate the offset correction signal based on the determined error signal, the method can include filtering the determined error signal based on frequencies to generate the offset correction signal.

Aspects of the disclosure can also provide an apparatus for generating an offset correction signal with a reduced circuit footprint. The apparatus can include a digitalization module configured to convert samples of a signal into digital values having a reduced number of bits, an offset detector configured to integrate the digital values having the reduced number of bits over a time interval to determine an error signal, and an offset control unit configured to generate an offset correction signal based on the determined error signal.

In an embodiment, the digitalization module can include an analog to digital converter (ADC) configured to convert the samples of the signal into intermediate digital values having a first number of bits that is higher than the reduced number of bits, and a resolution reducing module configured to convert the intermediate digital values into the digital values by reducing resolution. Further, the resolution reducing module can include a slice module configured to slice the intermediate digital values based on a threshold value, and convert the intermediate digital values into the digital values based on the slicing.

In another embodiment, the digitalization module can include a first analog to digital converter configured to convert the samples of the signal into digital values of a first number of bits, and a second analog to digital converter configured to convert the samples of the signal into the digital values of the reduced number of bits that is lower than the first number of bits.

Alternatively, the digitalization module can include a comparator configured to output a 1-bit digit based on comparing the samples of the signal with a reference.

According to an aspect of the disclosure, the time interval can include a positive integer number of wobble periods.

Further, the offset detector can include an accumulator configured to accumulate the digital values, and reset based on the time interval. The offset control can include a filter module configured to filter the determined error signal based on frequencies to generate the offset correction signal.

Aspects of the disclosure can provide a recording system with a reduced circuit footprint. The recording system can include a tracking apparatus configured to generate a signal based on a track on a storage medium, a digitalization module configured to convert samples of the signal into digital values having a reduced number of bits, an offset detector configured to integrate the digital values having the reduced number of bits over a time interval to determine an error signal, an offset control unit configured to generate an offset correction signal based on the determined error signal, an offset correction module configured to correct the signal with the offset correction signal, and a recording apparatus that records data on the track of the storage medium based on the corrected signal.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

The following description of various exemplary embodiments of systems and methods for implementing an improved offset loop for detecting an offset by referencing a wobble signal according to this disclosure may refer to optical disc data storage media and systems and methods for recording data on, and retrieving data from, such media for clarity and ease of understanding. All references to such systems and media, such as those shown in exemplary manner in FIGS. 1-4, are intended to be illustrative of environments to which systems and methods according to this disclosure may be adapted. The systems and methods according to this disclosure should not be construed, however, as being limited to such applications, or to any specific system that may be considered limited by the elements shown in the figures. An offset detector according to the systems and methods of this disclosure may find applicability in any system in which a typically sinusoidal wave may be used for, for example, timing synchronization and/or any manner of identification of information, and where precise timing synchronization may prove beneficial in reducing or otherwise eliminating errors in the functioning of such system by introducing a correction factor based on integration of the available sinusoidal information within the system.

The systems and methods according to this disclosure provide a capability to extract information from recording tracks of a recordable and/or re-recordable optical disc data storage medium that are wobbled to assist, for example, with timing synchronization during recording, and/or to give address information, and to detect an offset correction which can be input as an offset control to facilitate timing synchronization and other benefits during playback. Such timing synchronization and other benefits are designed to reduce and/or eliminate errors in data recovery from sources such as, for example, low frequency distortions in radial push-pull (RPP) signals within such systems.

Figure 6:
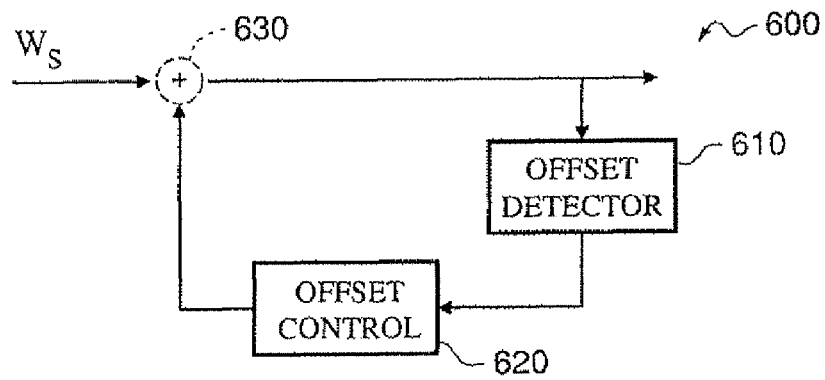
FIG. 6 schematically illustrates a first embodiment of an offset control loop that may employ an offset detector according to this disclosure.
Figure 7:
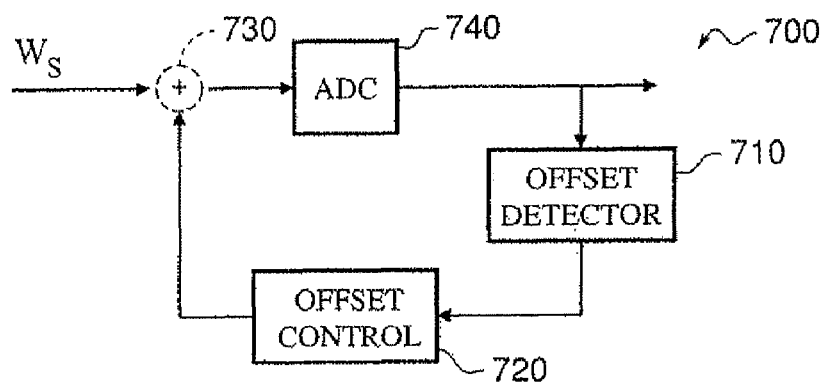
FIG. 7 schematically illustrates a second embodiment of an offset control loop that may employ an offset detector according to this disclosure.

Exemplary offset control loops are shown, for example, in FIGS. 6 and 7 and may be provided in a system for recording data to, and/or reading data from, an optical disc data storage medium to reduce data recording or reproducing errors in data recording and reproducing systems. As discussed briefly above, the recording track of an optical disc data storage medium is wobbled as a sinusoid such that RPP signals form a basically sinusoidal waveform during data recovery, playback and/or readback. Because low frequency distortions can degrade the ability to implement, or otherwise degrade the quality of, timing synchronization information and/or detection of address information, systems and methods according to this disclosure provide improved methods for detecting low frequency distortions in the RPP signal. In various exemplary embodiments, an RPP signal may be integrated over one or more wobble periods to obtain a mean value of the signal. The mean value of the RPP signal may then be used, be calculated and fed back through an offset loop to provide offset control of a wobble signal to reduce, or even to eliminate, low frequency distortion that may be introduced into readback of data based on imprecision in system control.

According to a wobble signal method of data address and timing synchronization, a predetermined wobble is physically introduced by varying both walls of a groove in an optical disc data storage medium. This predetermined wobble may be used as an auxiliary clock signal during recording.

Figure 1:
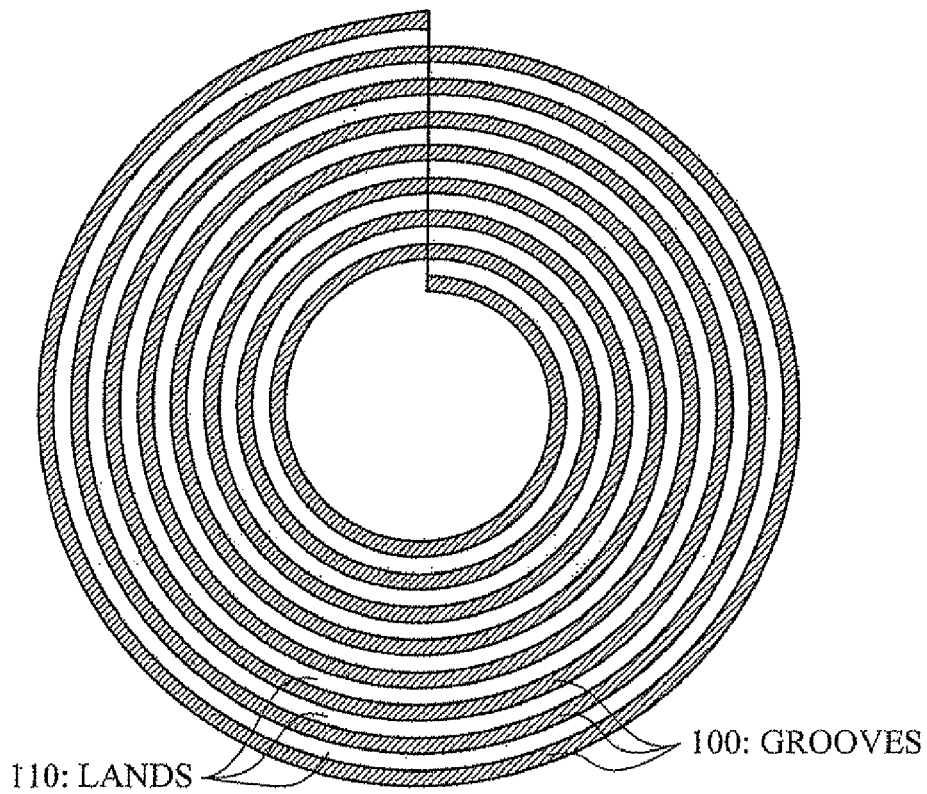
FIG. 1 schematically illustrates, in magnified detail, an exemplary embodiment of an optical disc data storage medium for land-groove recording.
Figure 2:
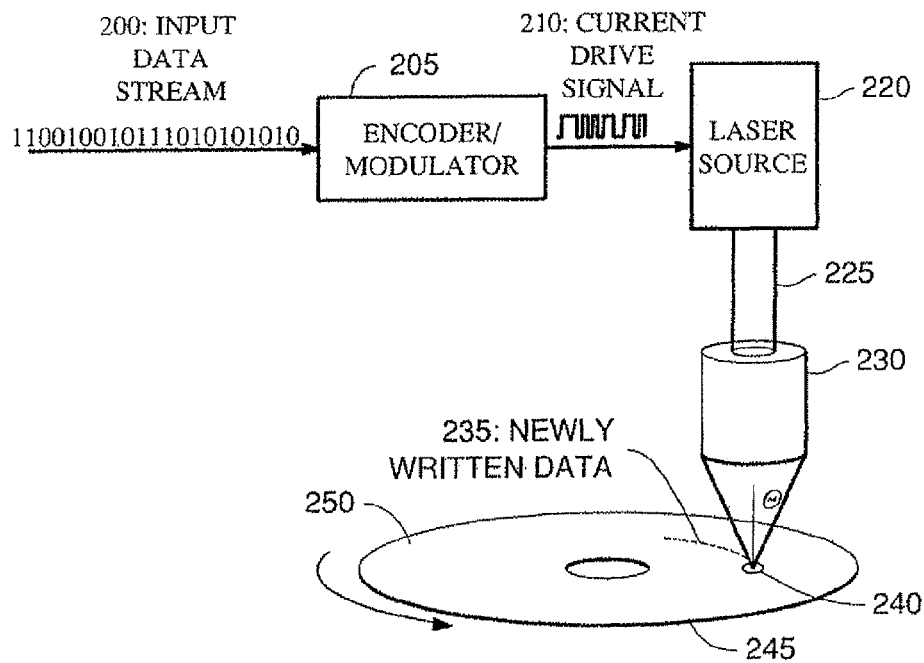
FIG. 2 illustrates an exemplary embodiment of a conventional apparatus for implementing a process to write data to an optical disc data storage medium.

Although the appearance of the optical discs is typically shown as a spiral configuration similar to FIG. 1, in actuality the grooves in the discs, to which the systems and methods according to this disclosure may be directed, include this predetermined wobble in the form of a radially sinusoidal wave. The wobble refers to a radially sinusoidal deviation of the groove track, as shown, for example, in FIG. 4. The groove is not a simple Archimedes Spiral, as shown in FIG. 1, rather it is "wobbled" in a sinusoidal fashion. During readback of the data stored on the optical disc data storage medium, a readback device such as that shown in conventional form in, for example, FIG. 3, just prior to, or coincident with, reading back the data stored on the disc may detect the predetermined wobble from an unrecorded sector of the optical disc data storage medium. The readback device employs this detected wobble to lock precisely onto, for example, a pre-groove track, and to then initially set the timing synchronization for readback of data from a specifically-addressed sector to which the readback device is directed.

Figure 4:
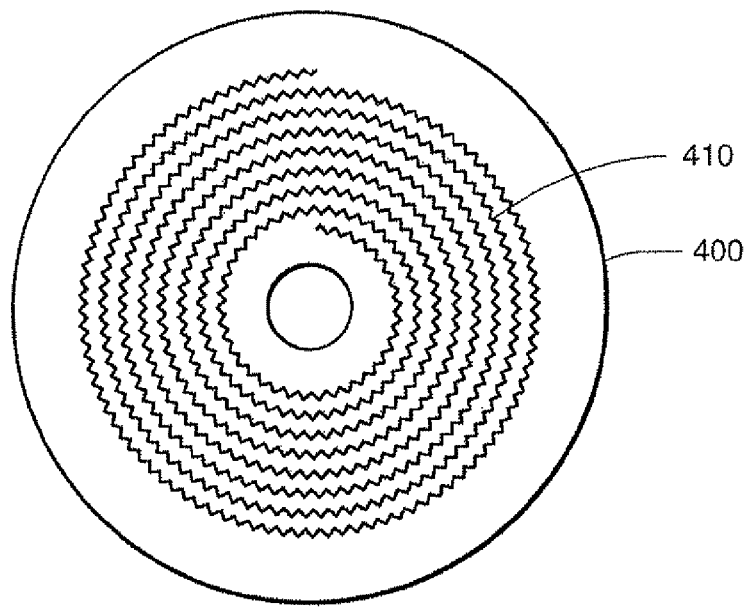
FIG. 4 illustrates an exemplary embodiment of an optical disc data storage medium with a radially sinusoidal predetermined wobble physically introduced into the lands and/or grooves of the optical disc data storage medium.
Figure 5A:
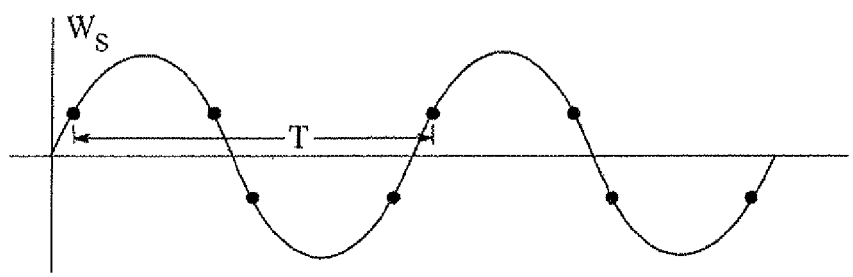
FIGS. 5A and 5B illustrate typical sinusoidal waves such as those introduced into the lands and/or grooves of the optical disc data storage medium shown in FIG. 4, and such a wave that is affected by DC-offset.

FIG. 5A illustrates a typical sinusoidal wave such as that introduced into the lands and/or the grooves of the optical disc shown in FIG. 4. Of note in FIG. 5A is that the wave is sinusoidally cyclic with a period indicated in FIG. 5A as T.

A predetermined frequency or phase modulation is introduced in the recording medium. This frequency and/or phase modulation is capable of being detected by the readback device. Differing methodologies have previously been employed to read (demodulate) this signal and to employ the demodulated signal to aid in identifying data, adjusting timing synchronization or implementing other purposes.

Alternatively, land pre-pits can be use in the recording medium. The land pre-pits can be detected by the readback device, for example, by detecting a saturation voltage in the readback signal.

Figure 5B:
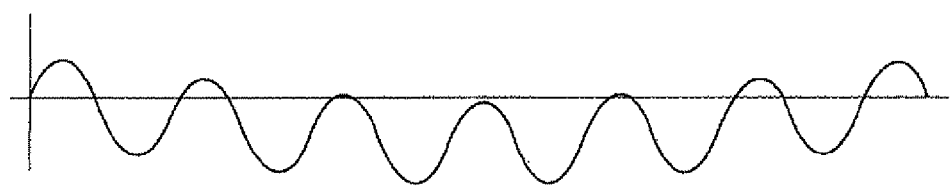

FIG. 5B illustrates a wobble signal exhibiting a low-frequency distortion (fluctuation) component and/or a DC-offset component to which the systems and methods according to this disclosure may be addressed. As shown in FIG. 5B, the wobble signal is not symmetric in amplitude about some preset level over several periods. Integrating this wobble signal, for example, over one or more periods would result in identification of a non-zero DC-offset. By subtracting such a determined DC-offset from the raw wobble signal, a corrected wobble signal may be presented to the various filters and/or phase-locked-loop circuits and systems for retrieving information from, for example, optical disc data storage media.

FIG. 6 schematically illustrates an offset control loop 600 that may employ an exemplary offset detector according to this disclosure. In general, in an offset control loop 600, the offset component is detected by an offset detector 610 through a sampling procedure of, for example, a wobble signal. On the basis of the offset component thus detected, an offset correcting signal is calculated and introduced via an offset control unit 620 to produce a signal that mediates or cancels out the detected offset component.

Figure 10:
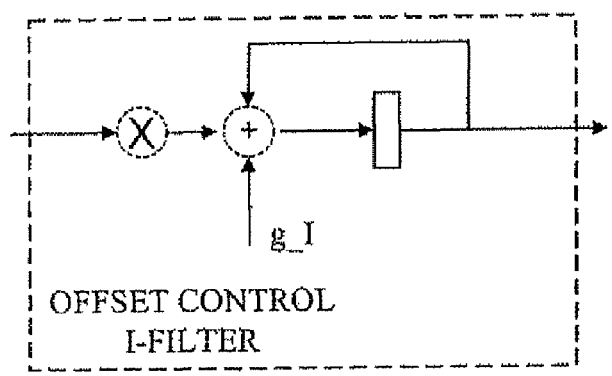
FIGS. 10 and 11 schematically illustrate first and second embodiments of filters that may be included in an offset control loop and coupled with an offset detector according to this disclosure.
Figure 11:
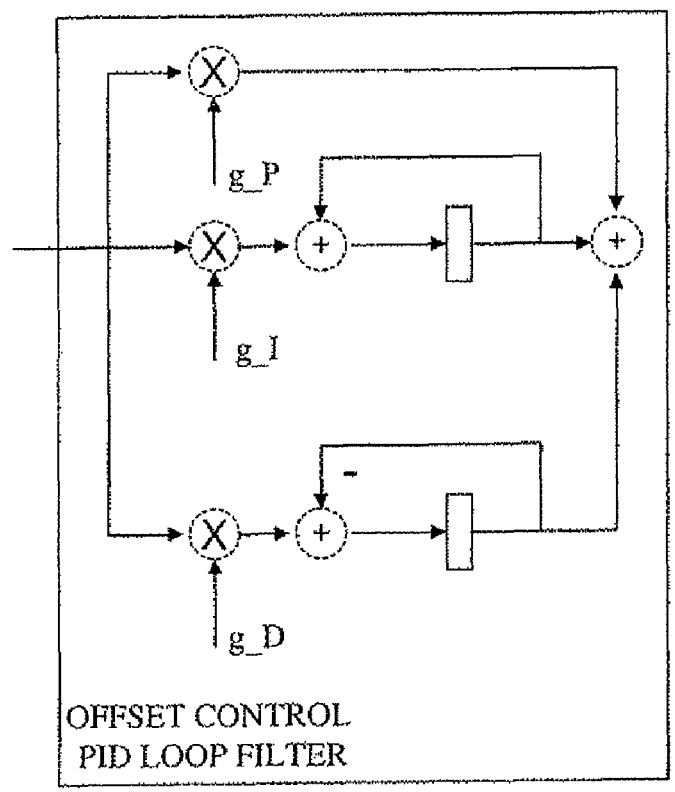

An offset correction detected by the offset detector 610 and properly converted by the offset control unit 620 may be added at an adder 630 to the input wobble signal $w_s$ and the output signal passed to the system within which the offset control loop is housed to better facilitate control of timing synchronization in the system. The output signal may be passed to the offset detector 610 generally continuously in order that a detected offset error signal is fed to the offset control unit 620 to automatically and constantly update the offset correction signal. Employing such offset correction is desirable to reduce and/or otherwise eliminate low frequency distortions that may lead to data readback errors. Offset control unit 620, such as that schematically illustrated in FIG. 6, may be but a single offset control block element, for example, a low pass filter for filtering incoming error signals for low frequency components or DC component. Typical filters for performing such functions are shown in FIGS. 10 and 11. Inputs to, and outputs from offset control loops may be in a form of both analog and digital signals.

FIG. 7 schematically illustrates a second embodiment of an offset control loop 700 that may employ an offset detector according to this disclosure. In FIG. 7, an offset control loop 700 includes use of a correction in an analog domain with an offset detector in the digital domain. It should be recognized and appreciated that analog to digital conversion need not occur in the depicted portion of the circuit. Rather, differing offset control loops may deal with wobble signal information as either digital or analog data, any necessary conversion may occur at other portions in the circuit.

The offset control loop 700 illustrated in FIG. 7 includes many of the same features of the offset control loop shown in FIG. 6. These include an offset detector 710, offset control unit 720 and an adder 730. Offset control loop 700 also incorporates, however, an analog-to-digital converter (ADC) 740. With the inclusion of the ADC 740, wobble signal inputs are converted from analog to digital format for use in the offset detector 710 and offset control unit 720, and to be otherwise output to the system from the offset control loop 700.

Figure 8:
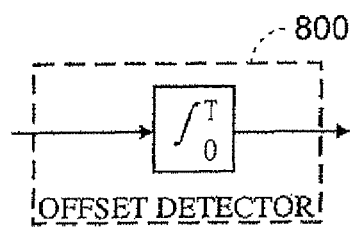
FIG. 8 schematically illustrates an offset detector according to the systems and methods of this disclosure that may be introduced into typical embodiments of offset control loops such as those illustrated in FIGS. 6, 7, and 9.
Figure 9:
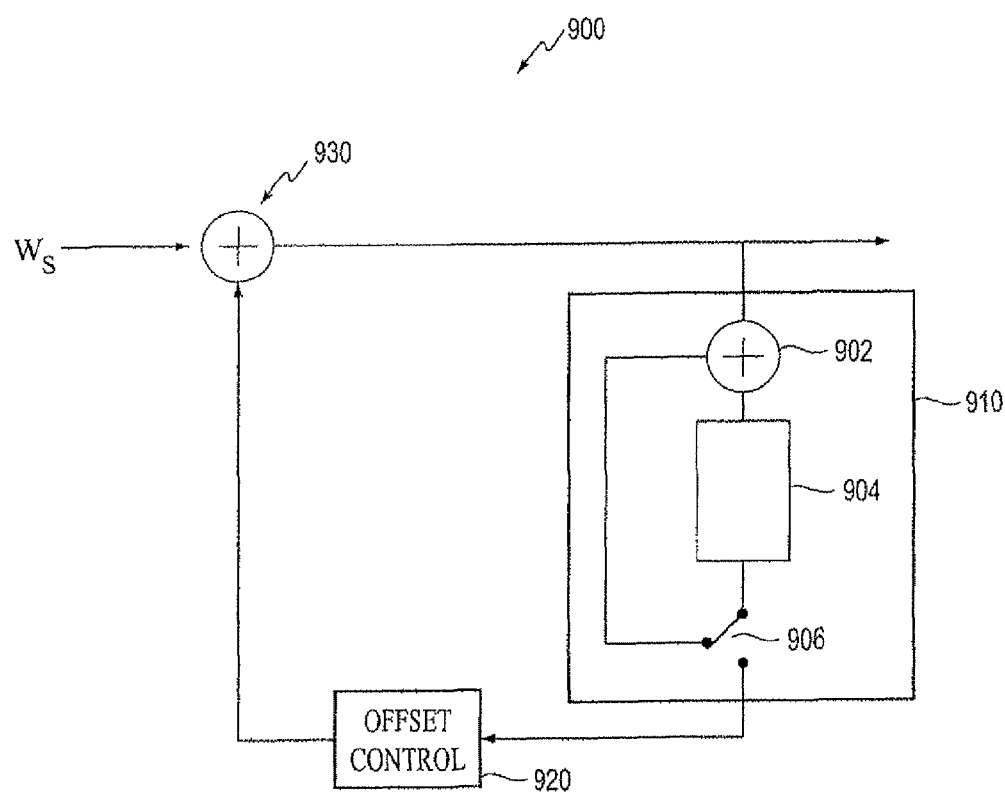
FIG. 9 schematically illustrates a third embodiment of an offset control loop including a dump signal for selectively introducing offset control to the system, which may employ an offset detector according to this disclosure.

FIG. 8 schematically illustrates an offset detector according to the systems and methods or this disclosure that may be introduced into typical embodiments of offset control loops such as those illustrated in FIGS. 6, 7 and 9. The offset detector 800 shown in FIG. 8 can be included in either of the offset control loops 600 or 700, as elements 610 or 710, as shown in FIGS. 6 and 7.

During playback and/or retrieval of information previously stored on the disc, the wobble signal, as phase or frequency shifted, or not, can be used as a timing synchronization signal. The playback apparatus retrieves the basically sinusoidal (or cosine) wave with or without phase shifts, and with or without frequency shifts.

In various exemplary embodiments, the offset detector 800 shown in FIG. 8 integrates the read wobble signal over one or more time intervals. Such time intervals may relate to a single or multiple sinusoidal wave periods (T as shown in FIG. 5A) or may otherwise include any periodic, sequential time window of a specified time interval, which may not be related to the sinusoidal period T of the wobble signal. Offset detection, as will be described in greater detail below, may be implemented by integrating the detected wobble signal over the specified time interval, i.e., one phase period T of the wobble signal, or otherwise in any timing window for sequentially integrating the wobble signal. The integration may be synchronized with the phase of the wobble signal over one or more periods of that signal. For many optical disc formats, integrating the wobble over one period may yield an expected value of zero. In such instances, any integrated result that is other than zero represents the detected offset. This detected offset may then be fed back through the offset control loop to the input wobble signal and the input wobble signal will then be corrected with this offset and output to the system within which the offset control loop is resident. Varying optical data disc storage media formats, with varying disc recording apparatus for recording information thereon, may yield deviations from zero for individual wobble periods due to types of modulation, frequency or phase modulation, employed. Over multiple wobble periods, however, the mean for such an integration operation should be zero. Again here, any non-zero integration result may represent a detected offset to be added to input wobble signal prior to output. Several other variations of this basic concept may be implemented. One such variation regards integration over wobble periods for systems which in some instances purposely generate a non-zero DC-offset. For these systems, the integration result should be equal to a predetermined DC-offset, or compared to the predetermined DC-offset in order to render a detected error.

In various exemplary embodiments, the systems and methods according to this disclosure provide an offset detector 800 that integrates the wobble signal over at least one wobble period to get an estimate of a correction signal, by using the following equation:

$$e_t = \sum_T \omega_s \qquad \text{(Equation 1)}$$

A determination may need to be made whether to synchronize the integration with the phase of the signal. For example, in cases where the data is encoded as phase shifts, the integration may be synchronized. If not, the integration may occur discretely or continuously over several cycles in order to nullify false errors that may be induced by, for example, interaction across a phase boundary.

FIG. 9 illustrates a third embodiment of an offset control loop 900 including a "dump signal" for selectively introducing offset control to the system which may employ an offset detector according to this disclosure. As shown in FIG. 9, the offset control loop 900 includes an offset detector 910, an offset control unit 920 and an adder 930. In this regard, the offset control loop shown in FIG. 9 is similar to those shown in FIGS. 6 and 7. Offset detector 910 incorporates an integrator consisting of an adder 902 and a memory element 904, a signal control switch or logic signal gate 906 to control when to output the integrated signal and reset the integrator. In offset control loop 900, offset detection occurs with offset detector 910. A difference is that integration occurs, via integrator 904 and internal adder 902 within offset detector 910 based on the position of logic signal gate 906. Output from the offset detector 910 is inhibited and not allowed to pass to the offset control unit 920 until a discrete "dump" signal is generated to close logic signal gate 906 to allow offset detector information to pass to the offset control unit 920.

It should be appreciated that the wobble period, as shown in the example in FIG. 5, may be specified according to an optical disc format. By way of example, for CD-R and DVD-R(W) formats, the integration may begin and end in any phase of the wobble period, as long as the integration time spans one wobble period. Because the wobbles for these two formats are sinusoids with either constant frequency (DVD-R(W)) or frequency modulated with small delta frequency (CD-R), exemplary embodiments according to this disclosure may employ sliding interval window filters of length equal to the wobble period.

It may be preferable not to integrate the wobble signal across phase shift boundaries in such an embodiment because such integration would, in the absence of DC-offset, temporarily yield non-zero mean error signals. However, if the integration is performed over phase shift boundaries, the non-zero mean of the error signals may cancel each other because the next phase transition boundary would yield an error signal mean of opposite sign from the previous phase shift boundary. In other words, an average error over a plurality of integration periods, for example, in integration periods covering eight wobble periods for which there might be a phase shift would be zero.

FIGS. 10 and 11 schematically illustrate first and second exemplary embodiments of filters that may be included in offset control loops and coupled with offset detectors according to this disclosure. FIG. 10 illustrates an integrating loop filter. FIG. 11 illustrates a proportional, integral and differential loop filter.

It should be appreciated that, given the required inputs for detection of a wobble signal, the processing outlined above with regard to the offset detector and/or offset control unit may be implemented through software algorithms, hardware or firmware circuits, or any combination of software, hardware and/or firmware detection control and/or processing elements.

Figure 12:
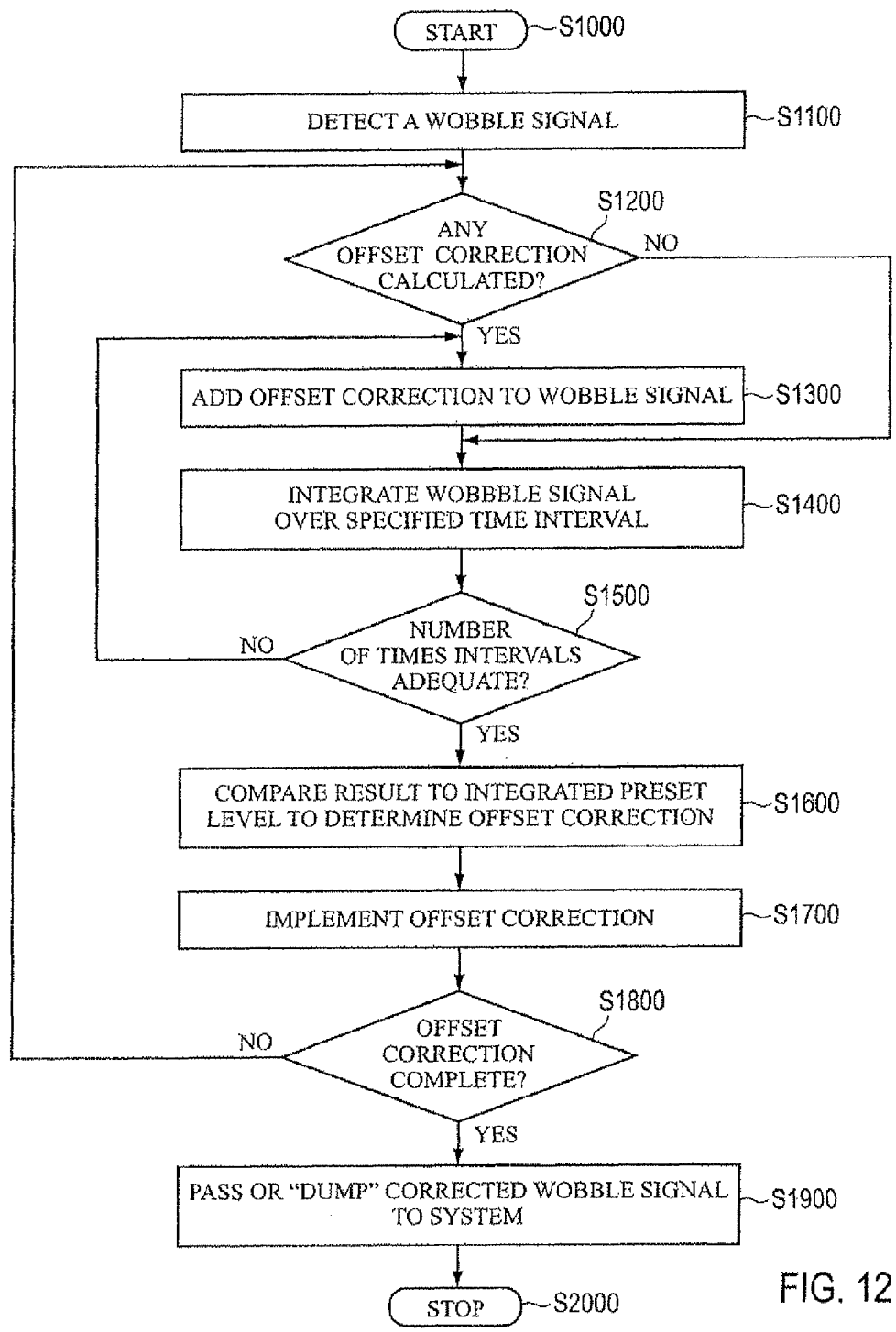
FIG. 12 is a flow diagram depicting an exemplary method for improved offset detection and timing synchronization signal error correction generation according to this disclosure.

FIG. 12 is a flow diagram depicting an exemplary method for improved offset detection and error correction using a wobble signal read from an optical disc data storage medium. As shown in FIG. 12 operation of the method begins at step S1000 and proceeds to step S1100.

In step S1100, a wobble signal is detected. Operation of the method continues to step S1200.

In step S1200, a determination is made whether any offset correction has previously been calculated. If, in step S1200, a determination is made that no offset correction has previously been calculated operation of the method continues directly to step S1400.

If, in step S1200, a determination is made that any offset correction has been calculated, operation of the method continues to step S1300.

In step S1300, any previously-calculated offset correction is added to the wobble signal. Operation of the method continues to step S1400.

In step S1400, the wobble signal is integrated over one or more specified time intervals. Thus, integration may occur discretely for a single time interval as shown in step S1400. Operation of the method optionally continues to step S1500.

In step S1500, a determination is made whether a single time interval is adequate. If, in step S1500, a determination is made that a single time interval is not adequate, operation of the method may revert to step S1300 where a first integrated value is added as an offset correction to the wobble signal and further integration occurs over additionally specified time intervals.

If, in step S1500, a determination is made that a single time interval is adequate or otherwise that the number of time intervals previously sampled is now adequate, operation of the method continues to step S1600.

In step S1600, a comparison of the integrated result is made to a preset level to determine an offset correction. Operation of the method continues to step S1700.

In step S1700, an offset correction is implemented, for example, by inputting an offset correction circuit through an adder to a wobble signal to produce a corrected wobble signal. Operation of the method continues to step S1800.

In step S1800, a determination is made whether offset correction is complete. If in step S1800, a determination is made that offset correction is not complete, operation of the method may revert to either step S1200, or step S1300, and continue.

If in step S1800, a determination is made that offset correction is complete, operation of the method proceeds to step S1900.

In step S1900, corrected wobble signal data is passed to the system. Such passing may occur by an auxiliary dump signal, for example, being manually or automatically input to a signal gate to cause the corrected wobble signal to be passed to the system in a controlled manner, or may simply be automatic. Additionally, the wobble signal although indicated in this method as being corrected by a series of discrete steps, may be continuously updated as individually identified steps in the method occur virtually simultaneously. Operation of the method continues to step S2000 where operation of the method ceases.

It should be appreciated that the time intervals discussed, for example, in steps S1400 and S1500 may be a single period of a wobble signal. Other time intervals, as discussed above, however, may be implemented.

According to an embodiment of disclosure, the offset control loop can be suitably implemented using reduced loop circuitry to reduce circuit footprint. Generally, the offset detector and the loop filters may include various circuit elements, such as accumulator, buffer, multiplexer, and the like to process wobble samples. The various circuit elements can be implemented using reduced circuitry if the wobble samples are represented with a reduced number of bits. For example, an accumulator may be implemented using a 15-bit adder when the wobble signal is sampled 186 times in a period, and each sample is converted to a 7-bit digital value. However, if each sample is represented by a 1-bit digital value, the accumulator may be implemented using a 9-bit adder, which can have reduced circuitry relative to the 15-bit adder.

Figure 13:
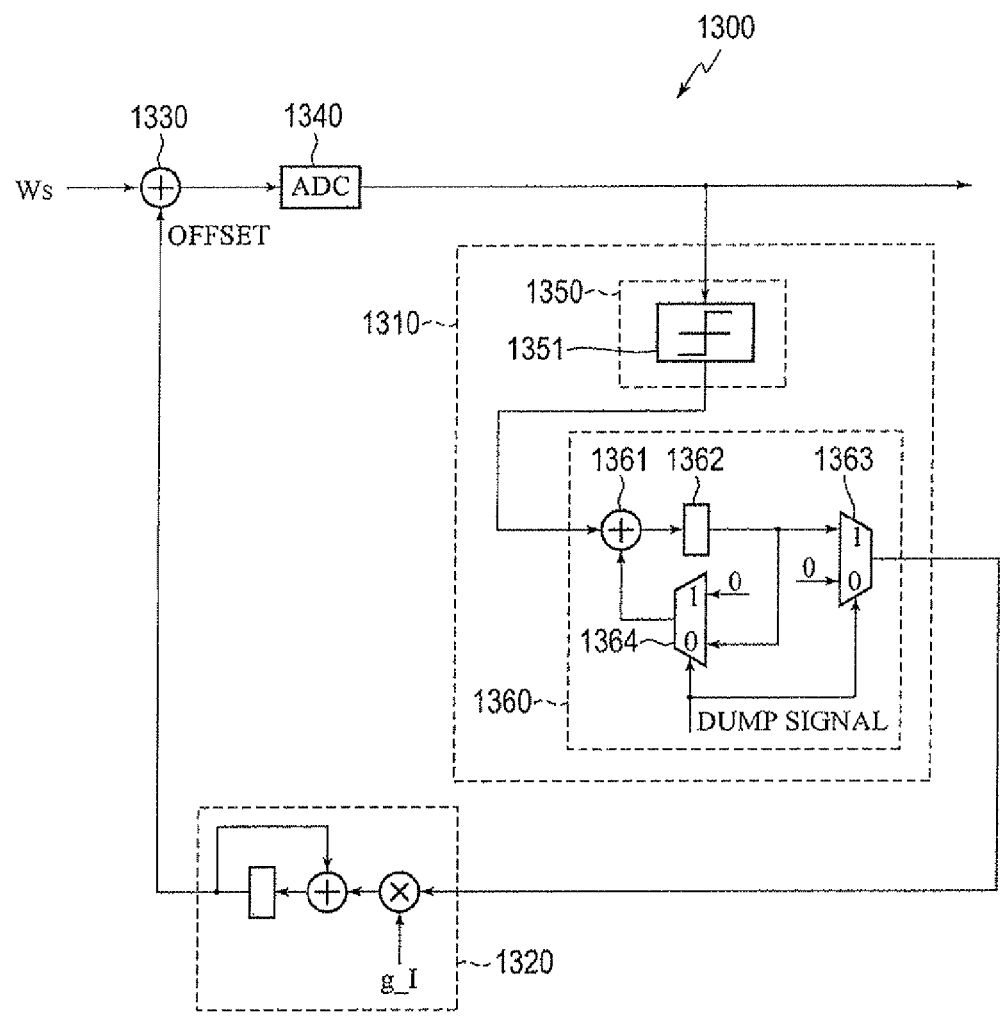
FIG. 13 shows a block diagram of an exemplary offset control loop that can be implemented using reduced loop circuitry.

FIG. 13 shows a block diagram of an exemplary offset control loop that can be implemented using reduced circuitry. The offset control loop 1300 can include an adder 1330, an ADC 1340, an offset detector 1310, and an offset control unit 1320. These elements can be coupled together as shown in FIG. 13.

The adder 1330 can receive a wobble signal, such as a sampled wobble signal Ws, and combine the sampled wobble signal Ws with an offset signal obtained from the offset control loop 1300 to compensate for low frequency or DC distortions of the wobble signal. The ADC 1340 can be implemented according to a wobble signal resolution requirement, such as 7-bit, to convert the combined wobble signal into digital wobble samples.

The offset detector 1310 may include a resolution reducing module 1350, and an integrate and dump offset detector 1360. The resolution reducing module 1350 can be configured to reduce a resolution of a digital wobble sample. In an example, the resolution reducing module 1350 may be implemented as a slice module 1351, which may use 1-bit or 2-bit to represent a digital wobble sample. For example, when the digital wobble sample is greater than zero, the slice module 1351 may use +1 to represent the digital wobble sample; and when the digital wobble sample is smaller than zero, the slice module may use −1 to represent the digital wobble sample.

The integrate and dump offset detector 1360 may include an accumulator 1361, a buffer 1362, a first multiplexer 1363 and a second multiplexer 1364. These elements can be coupled together as shown in FIG. 13.

The accumulator 1361 can be configured to add a digital wobble sample to a wobble accumulation. Because the digital wobble sample can have the reduced number of bits, the accumulator 1361 can be implemented using reduced circuitry. For example, the accumulator 1361 can be implemented by a 9-bit adder, instead of a 15 bit adder, for 186 wobble samples in a wobble period.

The buffer 1362 can be configured to buffer the wobble accumulation outputted from the accumulator 1361, and feedback the wobble accumulation to an input of the accumulator 1361 for adding a next sample. Due to the reason that the digital wobble sample has the reduced number of bits, the buffer 1362 can be implemented using reduced circuitry, such as using a 9-bit buffer instead of a 15-bit buffer.

The first multiplexer 1363 and the second multiplexer 1364 can be used to configure the integrate and dump offset detector 1360 into an operation mode based on a dump signal. More specifically, when the dump signal is logic "0", the first multiplexer 1363 and the second multiplexer 1364 can select input node "0" for outputting. Thus, the integrate and dump offset detector 1360 can be configured in an integrate-mode. In the integrate-mode, the integrate and dump offset detector 1360 can output zero. In addition, the integrate and dump offset detector 1360 can add samples into the wobble accumulation internally. When the dump signal is logic "1", the first multiplexer 1363 and the second multiplexer 1364 can select input node "1" for outputting. Thus, the integrate and dump offset detector 1360 can be configured in a dump-mode. In the dump-mode, the integrate and dump offset detector 1360 can output the wobble accumulation, and then reset the wobble accumulation internally.

The dump signal can be suitably provided to control the operations of the integrate and dump offset detector 1360. For example, the dump signal may be a periodic pulse signal having a period that equals a positive number of wobble periods.

The offset control unit 1320 can filter the wobble accumulation to obtain an offset signal, such as a low frequency component or a DC component, from the wobble accumulation. The offset control signal 1320 can be implemented using various suitable low pass filters, such as the low pass filters disclosed in FIG. 10 and FIG. 11. Due to the reason that the wobble accumulation may have a reduced number of bits, such as 9-bit instead of 15 bits, the offset control unit 1320 can also be implemented using reduced circuitry.

During operation, the ADC 1340 may convert a combined wobble sample into a digital wobble sample with a resolution, for example, 7-bit required by another circuit module (not shown). Then, the slice module 1351 can reduce the resolution of the digital wobble sample, such as from 7-bit to 2-bit. Further, the 2-bit digital wobble sample, instead of the 7-bit digital wobble sample, can be accumulated into a wobble accumulation when the integrate and dump offset detector 1360 is configured in the integrate-mode by the dump signal. Thus, the integrate and dump offset detector 1360 can be implemented with reduced circuitry. For example, the accumulator 1361 can be implemented using 9-bit instead of 15-bit; the buffer 1362 can be implemented using 9-bit instead of 15-bit; and the first multiplexer 1363 and the second multiplexer 1364 can be implemented using 9 bit instead of 15-bit.

When the integrate and dump offset detector 1360 is configured in the dump mode by the dump signal, the wobble accumulation can be outputted to the offset control unit 1320. The offset control unit 1320 can filter the wobble accumulation to obtain the offset signal, such as a low frequency component or a DC component of the wobble accumulation. In an embodiment, the offset control unit 1320 can be similarly implemented with reduced circuitry. Further, the offset signal can be provided to the adder 1330 to compensate for, for example, the low frequency distortion, or the DC distortion of the wobble signal.

Figure 14:
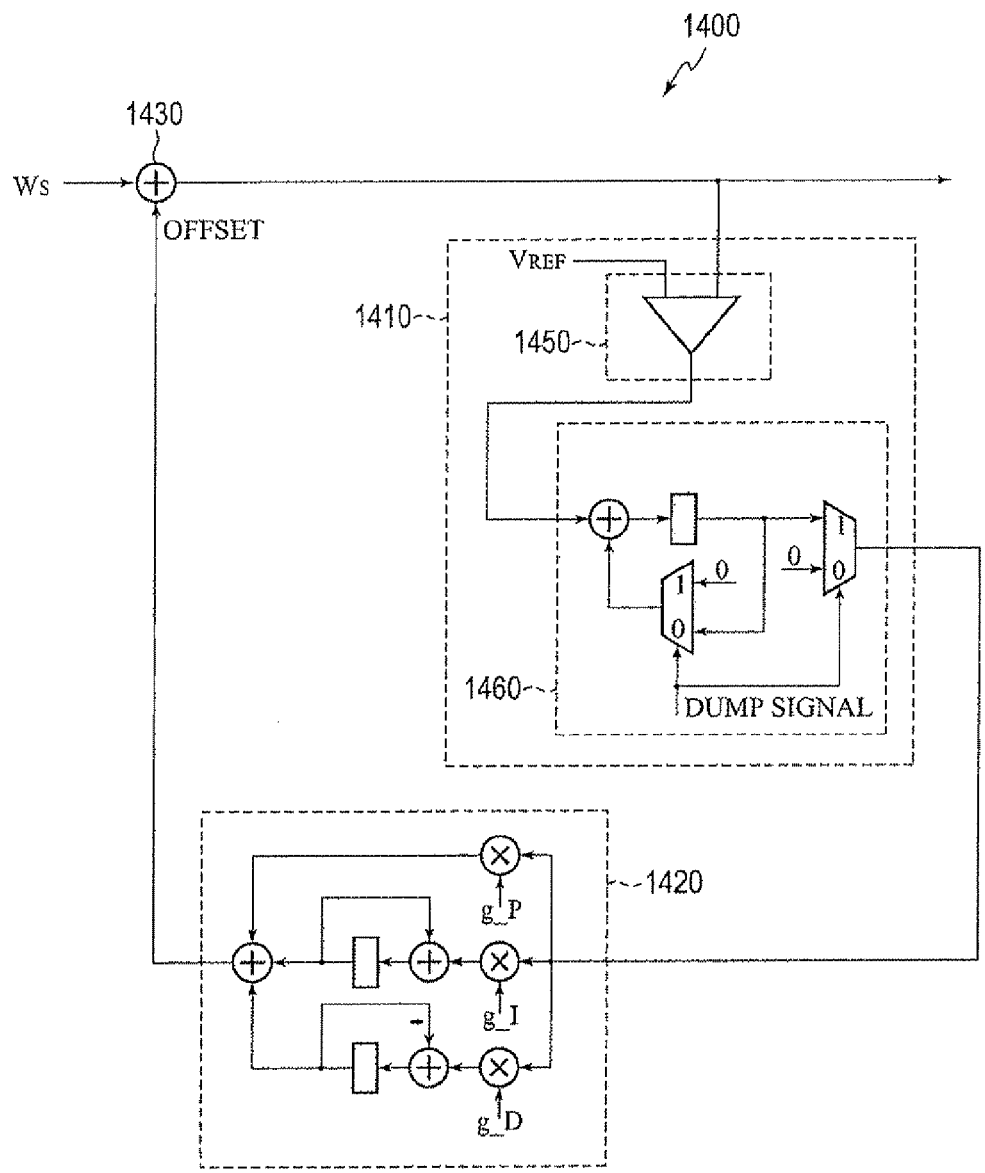
FIG. 14 shows a block diagram of another exemplary offset control loop that can be implemented using reduced loop circuitry.

FIG. 14 shows a block diagram of another exemplary offset control loop that can be implemented using reduced circuitry. The offset control loop 1400 can include an adder 1430, an offset detector 1410, and an offset control unit 1420. These elements can be coupled together as shown in FIG. 14.

The adder 1430 can receive a wobble signal, such as a sampled wobble signal Ws, and combine the sampled wobble signal Ws with an offset signal obtained from the offset control loop 1400 to compensate for low frequency or DC distortions of the wobble signal.

The offset detector 1410 may include a comparator module 1450, and an integrate and dump offset detector 1460. The comparator module 1450 can be configured to compare the combined wobble signal with a reference signal Vref to generate a low resolution digital wobble sample. In an example, the comparator module 1450 can output logic "1" when the combined wobble sample is greater than zero, and output logic "0" when the combined wobble sample is less than zero. In such a way, the combined wobble signal can be converted to a 1-bit digital value.

The integrate and dump offset detector 1460 can be similarly configured as the integrate and dump offset detector 1360 in FIG. 13. The offset control unit 1420 can be implemented using various suitable low pass filters, such as the low pass filters disclosed in FIG. 10 and FIG. 11.

During operation, a combined wobble sample can be converted to a low resolution digital wobble sample, such as a 1-bit digital wobble sample, by the comparator 1450. The 1-bit digital wobble sample can be accumulated into a wobble accumulation when the integrate and dump offset detector 1460 is configured in the integrate-mode. When the integrate and dump offset detector 1460 is configured in the dump mode by the dump signal, the wobble accumulation can be outputted to the offset control unit 1420. The offset control unit 1420 can further filter the wobble accumulation to obtain the offset signal, such as a low frequency component or a DC component of the wobble accumulation. Then, the offset signal can be provided to the adder 1430 to compensate for the low frequency distortion, or the DC distortion of the wobble signal.

Due to the reason that the digital wobble samples for processing in the offset control loop 1400 are represented by a reduced number of bits, various circuit elements in the integrate and dump offset detector 1460 and the offset control unit 1420, such as adders, buffers and multiplexers, can be implemented with reduced circuitry.

Figure 15:
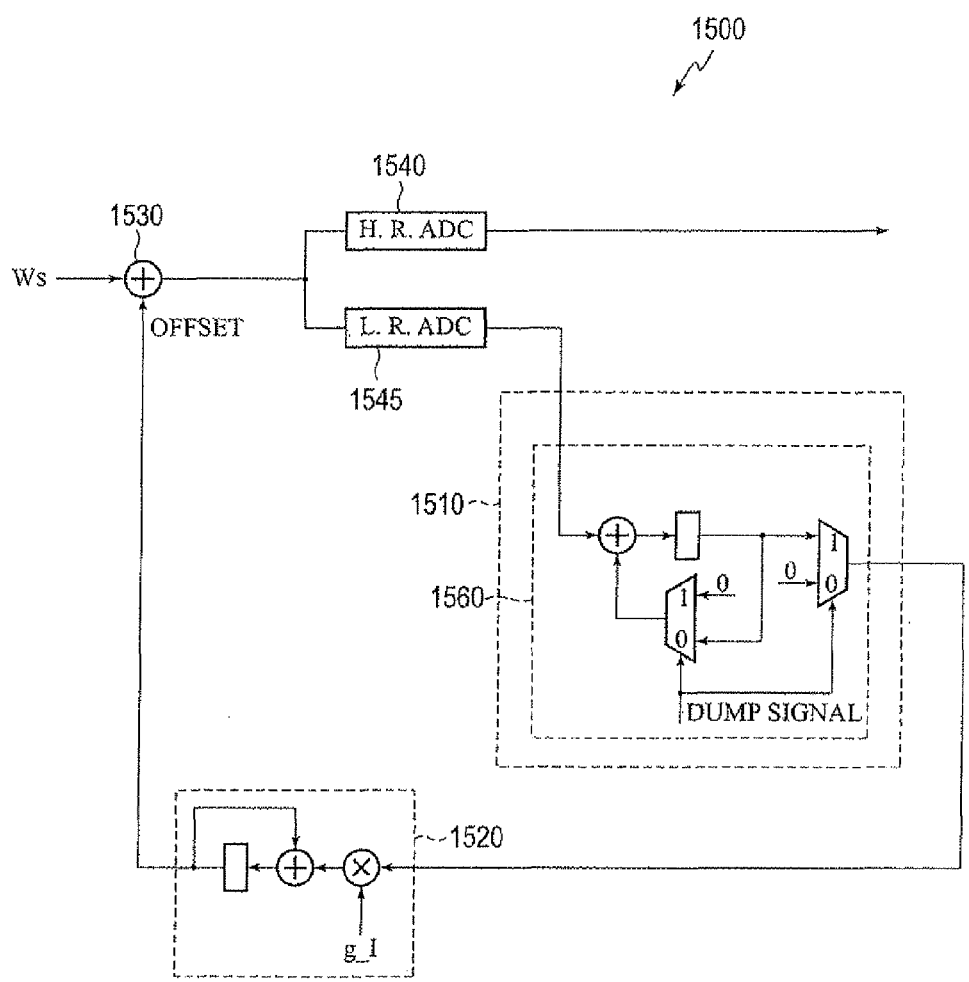
FIG. 15 shows a block diagram of another exemplary offset control loop that can be implemented using reduced loop circuitry.

FIG. 15 shows a block diagram of another exemplary offset control loop that can be implemented having reduced circuitry. The offset control loop 1500 can include an adder 1530, a first ADC 1540, a second ADC 1545, an offset detector 1510, and an offset control unit 1520. These elements can be coupled together as shown in FIG. 15.

The adder 1530 can receive a wobble signal, such as a sampled wobble signal Ws, and combine the sampled wobble signal Ws with an offset signal obtained from the offset control loop 1500 to compensate for, for example, low frequency or DC distortions of the wobble signal. The first ADC 1540 can be implemented as a high resolution ADC module according to a wobble signal resolution requirement, such as 7-bit, to convert the combined wobble signal into digital wobble samples. The second ADC 1545 can be implemented as a low resolution ADC module that can have a lower resolution than the first ADC 1540, such as 2-bit.

Figure 3:
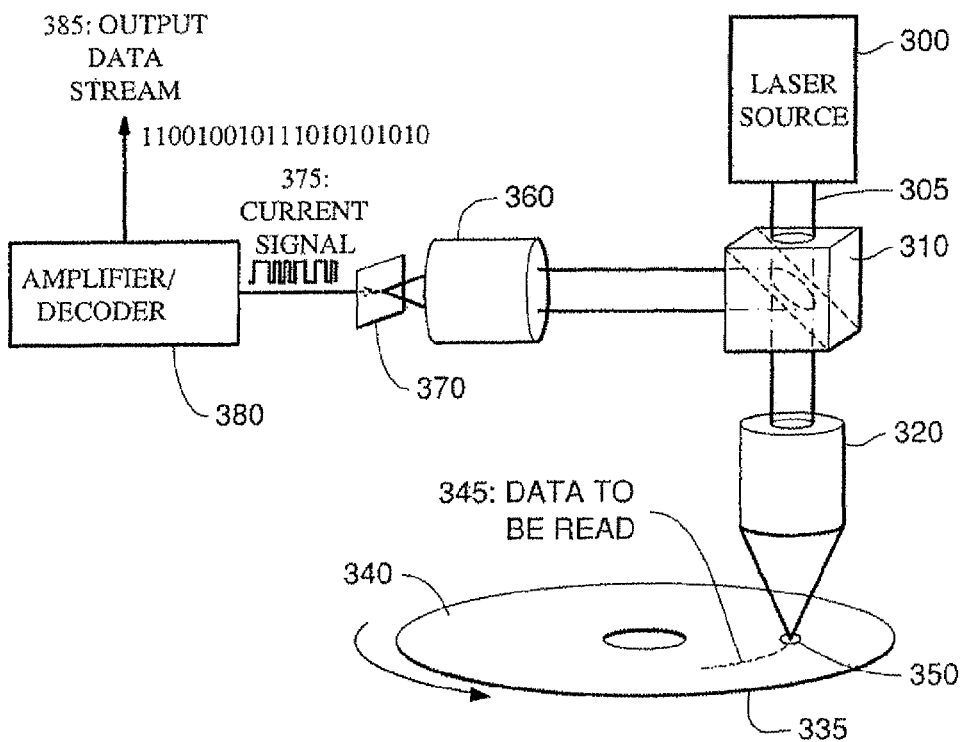
FIG. 3 illustrates an exemplary embodiment of a conventional apparatus for implementing a process to read data from an optical disc data storage medium.

The offset detector 1510 may include an integrate and dump offset detector 1560 that can be similarly configured as the integrate and dump offset detector 1360 in FIG. 3. The offset control unit 1520 can be implemented using various suitable low pass filters, such as the low pass filters disclosed in FIG. 10 and FIG. 11.

During operation, the first ADC 1540 may convert a combined wobble sample into a digital wobble sample with a resolution, for example, 7-bit required by another circuit module (not shown). The second ADC 1545 may convert the combined wobble sample into a reduced resolution digital wobble sample having a reduced number of bits that can be less than the number of bits of the digital wobble sample converted by the first ADC 1540. Further, the reduced resolution digital wobble sample, instead of the 7-bit digital wobble sample, can be accumulated into a wobble accumulation when the integrate and dump offset detector 1560 is configured in the integrate-mode. When the integrate and dump offset detector 1560 is configured in the dump mode by the dump signal, the wobble accumulation can be outputted to the offset control unit 1520. The offset control unit 1520 can further filter the wobble accumulation to obtain the offset signal, such as a low frequency component or a DC component of the wobble accumulation. In an embodiment, the offset control unit 1520 can be similarly implemented with reduced circuitry. Then, the offset signal can be provided to the adder 1530 to compensate for, for example, the low frequency distortion, or DC distortion of the wobble signal.

Due to the reason that the reduced resolution digital wobble samples for processing in the offset control loop 1500 are represented by the reduced number of bits, various circuit elements in the integrate and dump offset detector 1560 and the offset control unit 1520, such as adders, buffers and multiplexers, can be implemented with reduced circuitry.

Figure 16:
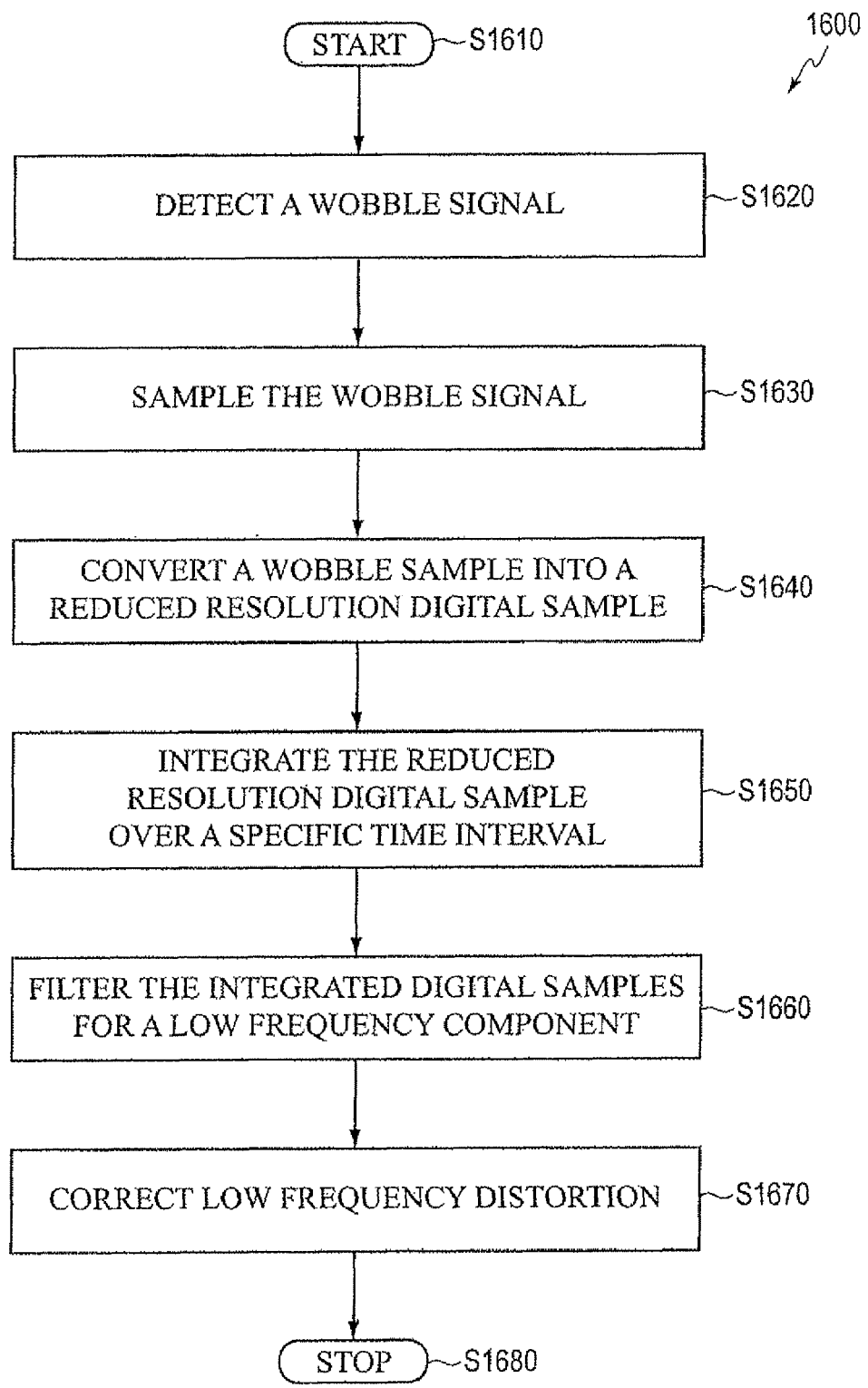
FIG. 16 shows a flow chart outlining an exemplary wobble offset correction process.

FIG. 16 shows a flow chart outlining an exemplary wobble offset correction process 1600. The process starts at step S1610, and proceeds to step S1620.

In step S1620, a wobble signal can be detected. Then, the process proceeds to step S1630.

In step S1630, the wobble signal can be sampled to generate wobble samples. Then, the process proceeds to step S1640.

In step S1640, a wobble sample can be convened to a reduced resolution digital sample. The reduced resolution digital samples can be represented by a reduced number of bits. In an embodiment, the wobble sample may be first converted to a high resolution digital sample. Then, the high resolution digital sample can be converted to the reduced resolution digital sample, for example, by a slice module. In another embodiment, the wobble sample can be converted to the reduced resolution digital sample by a low resolution ADC module, or a comparator module. Then, the process proceeds to step S1650.

In step S1650, the reduced resolution digital samples can be integrated over a specific time interval. The specific time interval can include a positive integer number of wobble periods. According to an embodiment of the disclosure, the reduced resolution digital samples can be processed by circuits of a reduced footprint, due to the reason that the reduced resolution digital samples have the reduced number of bits. Then, the process proceeds to step S1660.

In step S1660, the integrated digital samples can be filtered to obtain an offset signal, such as a low frequency component, or a DC component of the integrated digital samples. Then, the process proceeds to step S1670.

In step S1670, the offset signal can be used to correct the low frequency or DC distortions in the wobble signal. Then, the process proceeds to step S1680, and terminates.

It is noted that the above process 1600 can be repetitively executed. In addition, some steps in the process can be skipped or can be combined with other steps.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for generating an offset correction signal, comprising:
   converting samples of a signal into digital values represented by a first number of bits;
   reducing the first number of bits down to a predetermined second number of bits;
   integrating the digital values represented by the second number of bits over a time interval to determine an error signal; and
   generating an offset correction signal based on the determined error signal.

2. The method of claim 1, wherein converting the samples of the signal into the digital values further comprises:
   converting the samples of the signal into intermediate digital signals represented by the first number of bits that is larger than the second number of bits; and
   reducing resolution of the intermediate digital signals to convert the intermediate digital signals into the digital signals having the second number of bits.

3. The method of claim 2, wherein reducing resolution of the intermediate digital signals to convert the intermediate digital signals into the digital signals having the second number of bits, further comprises:
   slicing the intermediate digital signals by a threshold value; and
   converting the intermediate digital signals into the digital signals based on the slicing.

4. The method of claim 1, wherein converting the samples of the signal into the digital values having the second number of bits, further comprises:
   converting the samples of the signal by a first analog to digital converter having a first resolution; and
   converting the samples of the signal into the digital values by a second analog to digital converter having a second resolution that is lower than the first resolution.

5. The method of claim 1, wherein converting the samples of the signal into the digital values having the second number of bits, further comprises:
   comparing the samples of the signal to a threshold; and
   outputting a 1-bit digit based on the comparison.

6. The method of claim 1, wherein the time interval includes a positive integer number of wobble periods.

7. The method of claim 1, wherein integrating the digital values having the second number of bits over the time interval to determine the error signal, further comprises:
   resetting an accumulator;
   accumulating the digital values over the time interval; and
   outputting the accumulated digital values.

8. The method of claim 1, wherein generating the offset correction signal based on the determined error signal, further comprises:
   filtering the determined error signal based on frequencies to generate the offset correction signal.

9. An apparatus for generating an offset correction signal, comprising:
   a digitalization module configured to convert samples of a signal into digital values represented by a first number of bits;
   a slice module configured to reduce the first number of bits down to a predetermined second number of bits;
   an offset detector configured to integrate the digital values represented by the second number of bits over a time interval to determine an error signal; and
   an offset control unit configured to generate an offset correction signal based on the determined error signal.

10. The apparatus of claim 9, wherein the digitalization module further comprises:
    an analog to digital converter (ADC) configured to convert the samples of the signal into intermediate digital values having a first number of bits that is higher than the second number of bits; and
    a resolution reducing module configured to convert the intermediate digital values into the digital values by reducing resolution.

11. The apparatus of claim 10, wherein the resolution reducing module further comprises:
    the slice module configured to slice the intermediate digital values based on a threshold value, and convert the intermediate digital values into the digital values based on the slicing.

12. The apparatus of claim 9, wherein the digitalization module further comprises:
    a first analog to digital converter configured to convert the samples of the signal into digital values of a first number of bits; and
    a second analog to digital converter configured to convert the samples of the signal into the digital values of the second number of bits that is lower than the first number of bits.

13. The apparatus of claim 9, wherein the digitalization module further comprises:
    a comparator configured to output a 1-bit digit based on comparing the samples of the signal with a reference.

14. The apparatus of claim 9, wherein the time interval includes a positive integer number of wobble periods.

15. The apparatus of claim 9, wherein the offset detector further comprises:
    an accumulator configured to accumulate the digital values, and reset based on the time interval.

16. The apparatus of claim 9, wherein the offset control unit further comprises:
    a filter module configured to filter the determined error signal based on frequencies to generate the offset correction signal.

17. A recording system, comprising:
    a tracking apparatus configured to generate a wobble signal based on a track on a storage medium;
    a digitalization module configured to convert samples of the signal into digital values represented by a first number of bits;
    a slice module configured to reduce the first number of bits down to a predetermined second number of bits;
    an offset detector configured to integrate the digital values represented by the second number of bits over a time interval to determine an error signal;
    an offset control unit configured to generate an offset correction signal based on the determined error signal;
    an offset correction module configured to correct the signal with the offset correction signal; and
    a recording apparatus that records data on the track of the storage medium based on the corrected signal.

18. The recording system of claim 17, wherein the digitalization module further comprises:
    an analog to digital converter (ADC) configured to convert the samples of the signal into intermediate digital values having a first number of bits that is higher than the second number of bits; and
    the slice module configured to slice the intermediate digital values based on a threshold value, and convert the intermediate digital values into the digital values based on the slicing.

19. The recording system of claim 17, wherein the digitalization module further comprises:
- a first analog to digital converter configured to convert the samples of the signal into digital values of a first number of bits; and
- a second analog to digital converter configured to convert the samples of the signal into the digital values of the second number of bits that is lower than the first number of bits.

20. The recording system of claim 17, wherein the digitalization module further comprises:
- a comparator configured to output a 1-bit digit based on comparing the samples of the signal with a reference.

* * * * *